Patented Sept. 24, 1935

2,015,297

UNITED STATES PATENT OFFICE 2,015,297

FOOD PRODUCT AND METHOD OF MANUFACTURE

Charles H. Vogt, Philadelphia, Pa., assignor to Modern Food Process Company, Philadelphia, Pa., a corporation of Delaware No Drawing. Application September 19, 1932, Serial No. 633,921

4 Claims. (Cl. 99—8)

This invention relates to novel meat products and to methods of preparing them for market. More particularly, the invention relates to improved boiled and baked ham and like products and to a method of handling the constituents so that the product may be very conveniently manufactured, and presented to the trade in such manner that its appearance to the prospective purchaser is highly attractive.

In my Patent 1,503,864, granted August 5, 1927, I have disclosed a boneless boiled ham product and a method of making the same. The present invention constitutes an improvement upon the invention of said patent in providing a simplified way of preparing the boneless boiled ham product for the market, and in improving the ham product in quality and appearance thereby materially enhancing its salability.

A primary object of this invention is to mold the ham product comprising fair sized pieces preferably about the size of a hen's egg, and comminuted pelvic or hock portions, in a ham retainer under pressure to form a loaf the shape of the retainer in such manner that a satisfactory product may be formed with great expedition.

A further object of the invention is to provide an improved method of preparing ham, or like meat product, for the market, consisting in forming a mixture of the more desirable portions of the ham cut into pieces of a relatively large size such as a hen's egg for example and cured, and comminuted particles of the less desirable portions of the ham, such as the hock or pelvic portions are cured and mixed with the larger portions so as to fill the voids therebetween all in the general manner set forth in said Patent 1,503,864. The mixture is packed into a lined tubular mold and cooked and formed in the mold.

Another object of the invention is to provide a cooked meat product consisting of relatively large pieces of the more desirable portions of the meat, and comminuted particles of the less desirable portions of the meat, all combined and baked with spices, sugar and the like to provide a convenient baked meat product having a neat and attractive appearance and highly desirable flavor.

Still another object of the invention is to provide an improved method of manufacturing a food product including the step of packing the product, including relatively large pieces of meat, into a mold lined with parchment or similar lining and with a thin layer of caul or similar fat that combines with and covers the outer surface of the loaf forming a protecting skin and imparting a highly desirable appearance to the product.

Still further objects of the invention will appear as a description thereof proceeds and are defined by the scope of the appended claims.

In carrying out the present invention, the hock and pelvic portions of a ham are separated from the more desirable central portions thereof. The latter are preferably cut into pieces the size of a walnut or of a hen's egg, while the hock and pelvic portions are ground up in any suitable manner into comminuted form. The comminuted particles and the larger pieces of meat are then separately cured as described in my patent above referred to, or in any other approved manner.

After the meat has been cured, the large pieces of the central portion thereof and the comminuted pelvic or hock portions are placed in a suitable mixing machine and the entire mass agitated so that the comminuted particles are distributed over the larger pieces and serve to substantially fill the voids that would otherwise exist between said larger pieces.

The body of a ham retainer or boiler provided with a spring pressed cover as disclosed in United States Patent 1,581,640, or of any other well known construction, is lined as follows. The bottom, sides and ends of the retainer body are lined with parchment, the end and side parchment lining extending sufficiently from the retainer body to completely fold over and cover the meat in the retainer body. The parchment lining the bottom, sides and ends of the retainer body is then lined with thin membraneous caul fat, preferably taken from a hog. Such fat comprises more skin or membrane irregularly checkered with veins of white fat that give it an attractive appearance. The meat mixture prepared as above set forth is then packed tightly into the lined body, the edges of the caul fat are folded over the top edges of the meat in the retainer, and the parchment is folded over the fat so that the meat mixture in the retainer is covered entirely with a sealing layer of parchment. The retainer body is preferably square in cross-section.

The cover is applied to the parchment covered product in the retainer body under the usual spring pressures used in boiling hams and the product is then boiled under pressure and chilled in the mold in accordance with usual ham boiling practice. As a result of this treatment the meat mixture together with the thin fat or membrane lining is formed into a compact unitary meat loaf having the form of the retainer. The parchment seals the meat juices in the loaf during the cooking and chilling operation providing a superior product, and permits the loaf to be readily removed from the retainer intact by gripping the free edges of the parchment lining and lifting. The parchment also protects the caul fat and prevents it from sticking to the mold, and when removed from the removed chilled loaf, leaves a compact unitary meat loaf the shape of the mold, the top, sides and ends of which are covered with an attractive protecting skin of checkered irregularity over its outer surface by veins of white fat. The top of the finished loaf is formed in the bottom of the mold and the bottom of the loaf is formed adjacent the retainer cover. The caul fat could of course be applied to the bottom of the loaf but this is unnecessary in practice. The covering of caul fat on the top, sides and ends protects the outer meat fibers and holds them together during handling and slicing and gives the product a highly desirable appearance.

If desired, the chilled product may be placed on trays and smoked in the usual manner, chilled and sold as a boiled ham product.

The unsmoked boiled product formed in the foregoing manner, and the unsmoked products formed in accordance with said patent numbered 1,503,864 and with the disclosure of my copending application Serial No. 596,046 with the casings removed, may be formed into highly desirable attractive appearing Virginia style and other baked products, for example by inserting cloves, spices and the like in the loaves, covering them with brown sugar and cracker dust, and baking them on trays while frequently basting with juices from the brown sugar and the meat during the baking operation to cause penetration of flavoring and to brown the outer surface of the product. The meat mixture is so thoroughly united during the boiling and chilling that it will not come apart or break up during baking at high temperature, and the inserted cloves and browning of the surface gives the product a highly attractive appearance, particularly to the product made in accordance with the foregoing disclosure having the thin fat outer covering. After baking the products are chilled and are then preferably wrapped in "cellophane" or other suitable wrapper for marketing. Smoking may be omitted in forming my improved baked products when spiced and baked in the manner set forth thereby saving the cost of the smoking operation.

Preferably the product is produced in such form that in cross-section it will correspond substantially exactly to the cross-section of a loaf of bread, so that when the compacted ham of the present invention is subsequently sliced the slices, which will be of a unitary character, will exactly fit between slices of bread making the manufacture of uniform sandwiches an extremely simple matter from the ham loaf or roll of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cooked meat product in molded form comprising relatively large pieces of cured ham; comminuted portions of the hock and pelvic parts of the ham substantially filling the voids between said large pieces, and a protecting skin of caul fat intimately united with the normally visible outer surfaces thereof.

2. A cooked food product in molded form comprising relatively large pieces of meat; comminuted meat substantially filling the voids between said large pieces; and a layer of caul fat substantially covering the tops, sides and ends thereof and intimately united therewith.

3. The method of forming a meat product consisting of a mixture of pieces of meat of substantial size and meat particles in comminuted form filling the voids between the large pieces of meat, which comprises stuffing the mixture into a mold lined with a layer of parchment and a layer of caul fat, and cooking the mixture under pressure in the lined mold.

4. The method of preparing ham or the like for the market in a retainer comprising a body and a cover, which comprises separating the hock and pelvic portions from the remaining portion of the ham; comminuting said hock and pelvic portions; cutting said remaining portions into relatively large pieces; curing the large and small pieces; mixing the large pieces and the comminuted hock and pelvic portions; lining the retainer body with a layer of parchment; lining the parchment in the body with a layer of caul fat; filling the meat mixture into the lined body; folding the ends of the parchment lining over the meat mixture; applying the cover to the product in the body under pressure; and cooking and chilling the product in said body under pressure.

CHARLES H. VOGT.